United States Patent [19]

Berger

[11] Patent Number: 5,109,199
[45] Date of Patent: Apr. 28, 1992

[54] SEAT BELT BUCKLE MONITOR SWITCH HAVING COOPERATIVE CIRCUIT

[75] Inventor: Josef Berger, Wolfschlugen, Fed. Rep. of Germany

[73] Assignee: Daimler-Benz AG, Fed. Rep. of Germany

[21] Appl. No.: 479,155

[22] Filed: Feb. 13, 1990

[30] Foreign Application Priority Data

Mar. 18, 1989 [DE] Fed. Rep. of Germany ....... 3908993

[51] Int. Cl.⁵ .................... G01R 31/02; H01H 3/16
[52] U.S. Cl. .................... 324/415; 200/61.58 B
[58] Field of Search .................... 324/415, 418, 421; 340/687, 644, 457.1; 200/61.58 B

[56] References Cited

U.S. PATENT DOCUMENTS

| | | | |
|---|---|---|---|
| 3,383,671 | 5/1968 | Palos et al. | 340/644 |
| 3,452,271 | 6/1969 | Ketter | 324/415 |
| 4,580,062 | 4/1986 | MacLaughlin | 340/644 X |
| 4,686,478 | 8/1987 | Jabs | 340/644 X |
| 4,862,091 | 8/1989 | Hillebrand | 340/644 X |

FOREIGN PATENT DOCUMENTS 3413768  7/1985  Fed. Rep. of Germany .

*Primary Examiner*—Jack B. Harvey
*Attorney, Agent, or Firm*—Evenson, Wands, Edwards, Lenahan & McKeown

[57] ABSTRACT

A seat belt buckle monitor switch has a cooperative circuit for indicating the closed state of a seat belt buckle in a motor vehicle. Due to high-grade monitorability, it has a high sensory reliability. The device is structurally designed such that it allows an operation of additionally provided circuit elements in at least one monitoring current loop. If a contact element is at an erroneous potential due to interruption of a current path outside or inside the switching component, this is detected in the test circuit.

11 Claims, 1 Drawing Sheet

SEAT BELT BUCKLE MONITOR SWITCH HAVING COOPERATIVE CIRCUIT

BACKGROUND AND SUMMARY OF THE INVENTION

The invention relates to a seat belt buckle monitor switch indicating the closed state of a seat belt buckle in a motor vehicle and connected to a resistor network, wherein the switch has a switching finger supporting at least one first contact element which is able to make an electrical connection with at least one second contact element in dependence on the position of the switching finger.

Special switching devices for monitoring the closed state of seat belt buckles in motor vehicles are generally known. They are activated by a closed position of the seat belt buckle latch in the seat belt buckle. Thus, depending on whether the switch is opened or closed, a signal which corresponds to a safety belt which has not [or has] been put on by the occupant can be generated. A corresponding signal can be used for producing a warning signal for prevention of the motor vehicle being put into operation, etc.

To increase reliability, the prior art (FIG. 1) teaches that it is desirable to not trigger corresponding monitoring circuits directly by a switch, but rather to connect such a switch together with a voltage divider, consisting of two ohmic resistors, in such a way that one of the two resistors is bridged if the clearance between contacts is shorted. Depending on the application of a constant current or a constant voltage, the voltage then established along the series circuit (or the current flowing through it) can be evaluated. The information on switch closing appears within certain allowed tolerances, encoded into two permissible resistance values. In this way, a substantial independence of a closing signal from finite transfer resistors of the shorting switch is achieved.

Higher reliability requirements are obtained if such a switching device is not only used for alarm purposes, but is also operated as a sensor to influence the triggering threshold of another restraining device. For example this could be an air bag actuating device which is controlled in dependence on whether a vehicle occupant has put on the safety belt or not. For example, German Offenlegungsschrift 3,413,768 describes a corresponding occupant retaining system.

Prior art devices do not permit one to know whether or not the switch itself is defective, if a closing signal does not occur, or whether its electrical paths of connection to the said resistor network are defective.

An object of the instant invention is to provide a sensorily very reliable seat belt buckle monitor switch for indicating the closed state of a seat belt buckle in a motor vehicle.

This object is achieved in a cooperative circuit for monitoring the proper functioning of a switching component indicating the closing state of a seat belt buckle by having the switch include at least one first and second conductor bridge, each with a beginning terminal and an end terminal. A switching finger supporting the first contact element is electrically connected to the course of the first conductor bridge between its beginning terminal and end terminal. The second contact element is electrically connected to the course of the second conductor bridge between its beginning terminal and end terminal. The resistor network is connected to the beginning terminal of the first conductor bridge and to two separate lines connected to the beginning and end terminals of the second conductor bridge and has a further input.

It is also advantageous if the resistor network comprises only two electrically non-interconnected resistors which together with the second conductor bridge form a voltage divider. Additionally the switch can also have a third conductor bridge with beginning and end terminals and with a third contact element electrically connected to the course of the third conductor bridge between its beginning terminal and end terminal. Here the first contact element can establish an electrical connection with said third contact element in dependence on the position of the switching finger. Also a further resistor network is provided which is likewise connected to the beginning terminal of the first conductor bridge and via two corresponding lines to the beginning and end terminals of the third conductor bridge and has a further input.

It is also advantageous if the further resistor network comprises only two electrically not interconnected resistors, which together with the third conductor bridge form a voltage divider. At least one resistor network is also connected to the vehicle mass.

It is further advantageous if the two resistor networks are structurally combined into one unit and if the resistors are arranged either as thick-film or thin film resistors on an integral substrate.

In an advantageous way, the device according to the invention also allows all the leads to the switch to be monitored and an impermissible total resistance of the enquiry circuit in the closed state of the seat belt buckle to be assigned unambiguously to a defect of the switch, or to its activating elements, or to the test current path.

Other objects, advantages and novel features of the present invention will become apparent from the following detailed description of the invention when considered in conjunction with the accompanying drawings.

DETAILED DESCRIPTION OF THE DRAWINGS

Figure 1:
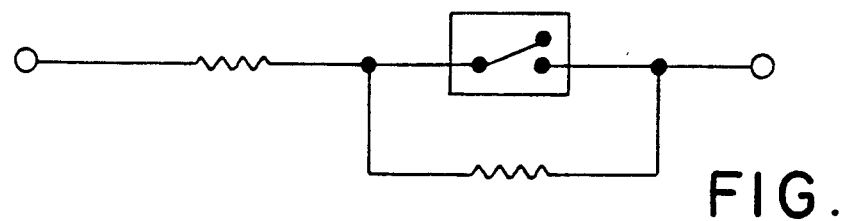
FIG. 1 shows a monitoring device according to the prior art.

FIG. 1 shows the prior art concept wherein a switching contact is provided in series with a first resistor and in parallel with a second resistor.

Figure 2:
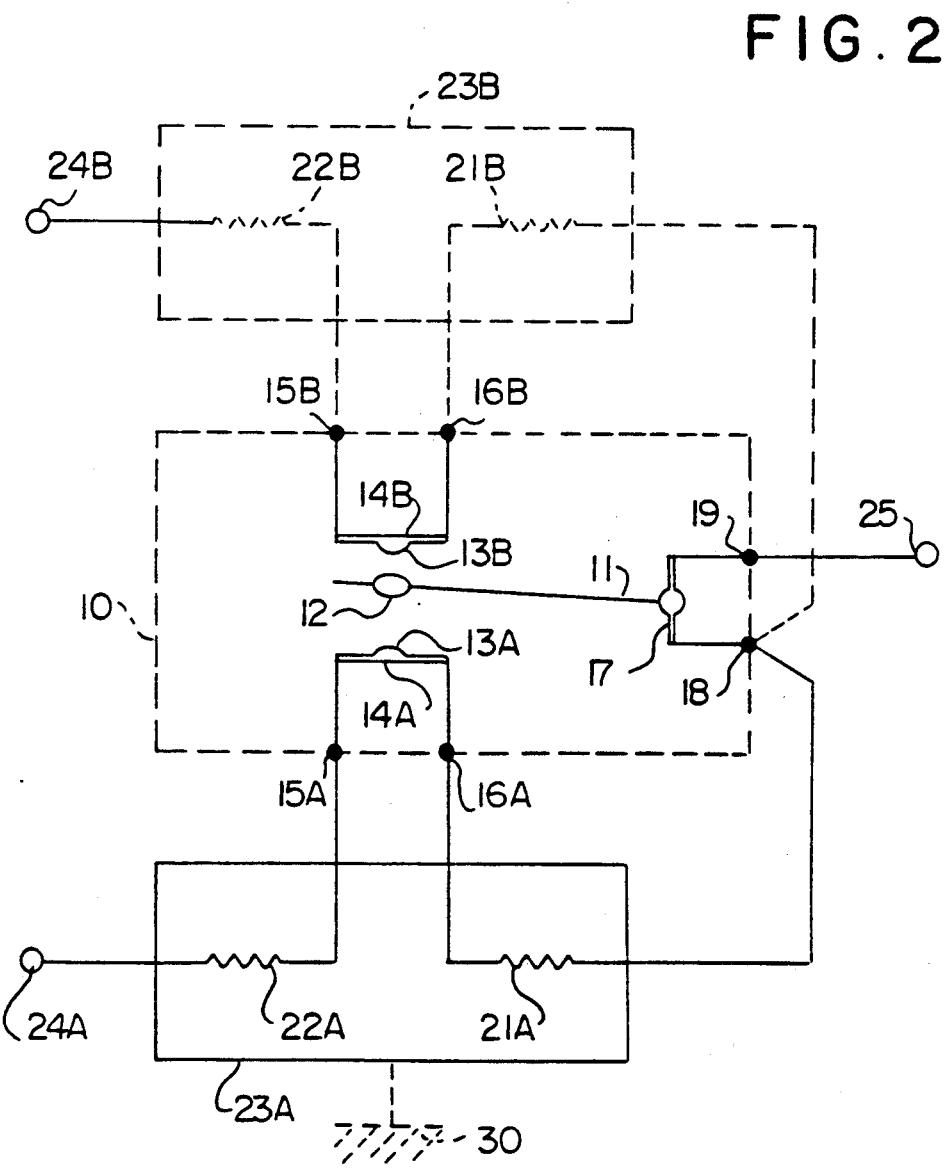
FIG. 2 shows an exemplary embodiment of the device according to the invention.

The device according to the invention as shown in FIG. 2 has a switch 10 with switching finger 11 that has a first contact element 12. The switching finger 11 can assume two stable end positions. The contact element 12 either bears against a second contact element 13A (for instance a make contact element) or against a rest bearing, or an opposite third contact element 13B (for instance a break contact element). The second and third contact elements 13A and 13B are secured electrically to conductor bridges 14A and 14B respectively. The switching finger 11 is electrically secured to bridge 17. The beginnings and ends of the conductor bridges 14A, 14B, and 17 are electrically connected to pairs of terminals 15A/16A, 15B/16B and 18/19 respectively. Consequently, it is possible to apply a current to any of the conductor bridges, depending on the position of the switching finger 11 at the locations of the second and third contact elements 13A and 13B respectively.

The device additionally comprises at least one resistor network 23A, which is connected via two lines to a pair of terminals 15A/16A of the second conductor bridge 14A, when only one OFF/ON switching function is desired. This network is connected via an output line to a terminal 18 of the conductor bridge 17 bearing the switching finger 11 and has an input 24A. In the simplest case, the network 23A may include just two manually insulated resistors 21A and 22A which are each connected on one side to the pair of terminals 15A/16A and which form a voltage divider between the input 24A and the terminal 18 of the conductor bridge 17, at the top of which the contact element 13A lies. The other terminal 19 of the conductor bridge 17 may be integral with the (common) output 25 of the device. Depending on the application, input 24A and output 25 may of course exchange roles. The network 23A may, but need not, be effectively connected to a vehicle mass 30.

In application when a switching OVER function is desired, there may also be a second resistor network 23B, which may then be structurally combined integrally with the network 23A. The network 23B is connected in a corresponding way via two lines to the pair of terminals 15B/16B of the third conductor bridge 14B, which bears the third contact element 13B (counter-contact to the contact 13A). It is likewise connected to the terminal 18 of the conductor bridge 17 bearing the switching finger 11. The network 23B has a corresponding input 24B.

In the simplest case, the network 23B may include just two mutually insulated resistors 21B and 22B, which are each connected on one side to the pair of terminals 15B/16B and form (between the in input 24B and the terminal 18 of the conductor bridge 17) a voltage divider, at the tap of which the contact element 13B lies.

The other terminal 19 of the conductor bridge 17 consequently represents the common output of the device for both switching branches. Depending on the application, input 24B and output 25 may, of course, also exchange roles. The network 23B may, but need not, be effectively connected to the vehicle mass 30.

According to the invention, the resistors may also be designed as film resistors, in particular by a thick-film or thin-film technique on a common substrate able to be accommodated in a protected manner.

A continuous current loop can be built up between the output 25 or conductor bridge terminal 19 and the input 24A or 24B. This allows an error detection under any circumstances if the contact element 13A or 13B are at an erroneous potential due to interruption of the respective current path outside or inside the switch 10. The two branches may either be used for different tasks, or one branch may be used for plausibility checking of the respective other branch. Thus this device allows for monitoring the proper function of a switch such as the closed state of a seat belt buckle with a very high availability and inherent reliability.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A seat belt buckle monitor switching device having a cooperative circuit for indicating the closed state of a seat belt buckle in a motor vehicle including a resistor network, the device comprising:

a switch having a switching finger supporting at least one first contact element;

wherein said contact element makes contact for establishing an electrical connection with at least one second contact element in dependence on the position of the switching finger;

wherein the switch has at least a first conductor bridge and a second conductor bridge, each having a beginning terminal and an end terminal;

wherein the switching finger is electrically connected to the first conductor bridge along the route between its beginning terminal and end terminal, wherein the second contact element is electrically connected to the second conductor bridge along the route between its beginning terminal and end terminal;

wherein said resistor network is connected between the beginning terminal of the first conductor bridge and, via two separate lines, to the beginning and end terminals of the second conductor bridge; and wherein said resistor network is provided with a further input to one of the two separate lines.

2. Device according to claim 1, wherein the resistor network comprises only two electrically non-interconnected resistors, which together with the second conductor bridge form a voltage divider.

3. Device according to claim 1, wherein the switch includes a third conductor bridge having a beginning and an end terminal;

a third contact element electrically connected to the third conductor bridge along the route between the beginning terminal and the end terminal of the third conductor bridge;

wherein the first contact element can establish an electrical connection with said third contact element in dependence on the position of the switching finger;

wherein a further resistor network is connected to the beginning terminal of the first conductor bridge and, via two respective separate lines, to the beginning and end terminals of the third conductor bridge; and wherein there is a further input to one of the two respective separate lines.

4. Device according to claim 3, wherein the further resistor network comprises only two electrically non-interconnected resistors, which together with the third conductor bridge form a voltage divider.

5. Device according to claim 1, wherein the resistor network is connected to a vehicle mass.

6. Device according to claim 3, wherein at least one resistor network is connected to a vehicle mass.

7. Device according to claim 3, wherein the two resistor networks are structurally combined into one unit.

8. Device according to claim 1, wherein the resistors of the resistor network are arranged as thick-film resistors on an integral substrate.

9. Device according to claim 3, wherein the resistors of the resistor networks are arranged as thick-film resistors on an integral substrate.

10. Device according to claim 1, wherein the resistors of the resistor network are arranged as thin-film resistors on an integral substrate.

11. Device according to claim 3, wherein the resistors of the resistor networks are arranged as thin-film resistors on an integral substrate.

* * * * *